United States Patent
Haugen et al.

(10) Patent No.: US 10,451,760 B2
(45) Date of Patent: Oct. 22, 2019

(54) SUBSEA EQUIPMENT ACOUSTIC MONITORING SYSTEM

(71) Applicant: General Electric Company, Schenectady, NY (US)

(72) Inventors: Svein Arild Haugen, Bergen (NO); Jens Abrahamsen, Bergen (NO); Geir Kjetil Nilsen, Bergen (NO)

(73) Assignee: General Electric Company, Schenectady, NY (US)

( * ) Notice: Subject to any disclaimer, the term of this patent is extended or adjusted under 35 U.S.C. 154(b) by 182 days.

(21) Appl. No.: 15/631,265

(22) Filed: Jun. 23, 2017

(65) Prior Publication Data

US 2017/0293043 A1    Oct. 12, 2017

Related U.S. Application Data

(63) Continuation of application No. 14/139,860, filed on Dec. 23, 2013, now Pat. No. 9,798,030.

(51) Int. Cl.
*G01V 1/40* (2006.01)
*E21B 47/00* (2012.01)
(Continued)

(52) U.S. Cl.
CPC ............ *G01V 1/40* (2013.01); *E21B 44/00* (2013.01); *E21B 47/0001* (2013.01);
(Continued)

(58) Field of Classification Search
CPC ...... G01V 1/40; G01V 2200/16; E21B 47/14; E21B 47/0001; E21B 33/0355;
(Continued)

(56) References Cited

U.S. PATENT DOCUMENTS 2,985,829 A    5/1961  Swift
4,065,747 A *  12/1977 Patten ............... E21B 34/16
                                          367/133
(Continued)

FOREIGN PATENT DOCUMENTS

EP    2565366    6/2013
GB    2405475    2/2005
WO    03100453   12/2003

OTHER PUBLICATIONS

Easystudy.info, Cable Mounting, 2012 (Year: 2012).*
(Continued)

*Primary Examiner* — Justin Seo
*Assistant Examiner* — David L Singer
(74) *Attorney, Agent, or Firm* — Mintz Levin Cohn Ferris Glovsky and Popeo, P.C.

(57) ABSTRACT

Systems and methods for monitoring subsea equipment are described herein. In one embodiment, such a system can include a plurality of acoustic sensor arrays that each include at least two acoustic sensors, wherein at least a first acoustic sensor array is mounted on an outer surface of subsea equipment being monitored and at least a second acoustic sensor array is positioned remote from the subsea equipment. The system can also include a digital data processor in communication with the plurality of acoustic sensor arrays, the digital data processor can be configured to process data from selected sensors of the plurality of acoustic sensor arrays to both selectively focus on a portion of the subsea equipment and to determine a point of origin of an acoustic signal. The system can be particularly useful in detecting leaks and other events in subsea drilling equipment.

14 Claims, 4 Drawing Sheets

(51) Int. Cl.
 *E21B 44/00* (2006.01)
 *E21B 47/10* (2012.01)
 *G01M 3/24* (2006.01)

(52) U.S. Cl.
 CPC ............ *E21B 47/101* (2013.01); *G01M 3/24* (2013.01); *G01V 2200/16* (2013.01)

(58) Field of Classification Search
 CPC ........ E21B 47/101; E21B 44/00; G01M 3/24; G01M 3/243
 USPC .......................... 73/152.47, 152.46; 166/337
 See application file for complete search history.

(56) References Cited

U.S. PATENT DOCUMENTS

| | | | |
|---|---|---|---|
| 7,300,033 | B1 | 11/2007 | Whitby et al. |
| 2001/0027865 | A1* | 10/2001 | Wester ................ E21B 47/0001 166/250.01 |
| 2005/0190649 | A1 | 9/2005 | Eisner et al. |
| 2008/0314597 | A1* | 12/2008 | Sbordone ............... E21B 17/015 166/335 |
| 2009/0078028 | A1* | 3/2009 | McStay ............... E21B 43/0122 73/45.5 |
| 2010/0280773 | A1 | 11/2010 | Saether |
| 2012/0027476 | A1 | 2/2012 | Tanaka |
| 2012/0126992 | A1* | 5/2012 | Rodney ............... E21B 33/0355 340/850 |
| 2012/0241160 | A1 | 9/2012 | Spacek |
| 2012/0275274 | A1 | 11/2012 | Gochnour et al. |
| 2013/0153241 | A1 | 6/2013 | Mallinson et al. |
| 2013/0215717 | A1 | 8/2013 | Hofland et al. |
| 2013/0223190 | A1* | 8/2013 | Coonrod ............. E21B 33/0355 367/133 |
| 2013/0332079 | A1 | 12/2013 | Gudivada et al. |
| 2014/0025319 | A1* | 1/2014 | Farhadiroushan ...... G01S 5/186 702/56 |
| 2015/0292980 | A1* | 10/2015 | Veeningen ............ E21B 33/064 356/73.1 |

OTHER PUBLICATIONS

Rockwell Automation, Application Techniques Mounting Techniques, 2008 (Year: 2008).*
SKF Condition Monitoring, Vibration Sensors, 1999 (Year: 1999).*
Abrahamsen et al., "Ormen Lange Subsea Condition and Leakage Monitoring", Society of Petroleum Engineers, pp. 1-5, Sep. 2007.
European Search Report and Written Opinion issued in connection with corresponding EP Application No. 14198748.7 dated Feb. 29, 2016.

* cited by examiner

SUBSEA EQUIPMENT ACOUSTIC MONITORING SYSTEM

PRIORITY

This U.S. Patent Application is a continuation of U.S. patent application Ser. No. 14/139,860, filed Dec. 23, 2013, entitled "Subsea Equipment Monitoring System," which is hereby incorporated by reference herein in its entirety.

FIELD

The present invention relates to subsea industrial activities and, in particular, to systems and methods for monitoring subsea equipment, such as oil and gas extraction equipment.

BACKGROUND

For many years, certain industrial activities, such as oil and gas extraction, have increasingly expanded to subsea locations, as the number of available land-based sites has declined. The seafloor, however, is a harsh and inaccessible environment, and many activities, e.g., drilling operations, involve considerable risk of environmental contamination. In some cases, an oil or gas well can be located thousands of feet below the surface of the water where no human can go. As a result, monitoring the safety and efficiency of drilling equipment can be difficult.

For example, in many cases the instruments used to monitor subsea drilling equipment (or other types of equipment) fail more often than the equipment itself. Failure of the monitoring instruments can create false positive warnings of drilling equipment failure, and can necessitate excess maintenance procedures to fix the monitoring system. Furthermore, traditional monitoring instruments are often incorporated into the drilling equipment and, as a result, repairing the instruments can require a costly operation to bring the piece of equipment up from the seafloor. Moreover, even when monitoring instruments are operating correctly, they provide little detail, e.g., allowing operators to determine only whether a major event (e.g., a catastrophic component failure) has occurred.

Prior art systems have attempted to address the above issues, but with little success. For example, acoustic monitoring of subsea equipment has been attempted using sensors mounted remotely from the subsea equipment, but these systems suffer from the same lack of detail discussed above. Accordingly, they provide little value to operators beyond reporting a major event (e.g., a catastrophic component failure).

Given these shortcomings, monitoring instruments for subsea equipment are often considered unreliable and not used. Without any ability to monitor subsea equipment during operation, acceptable safety levels are achieved by building overly robust subsea equipment and implementing conservative maintenance schedules—both of which add considerable cost to subsea operations.

Accordingly, there is a need in the art for improved subsea equipment monitoring systems that can provide more detailed monitoring of equipment during operation. In addition, there is a need for such systems to have built-in redundancy and the ability to be serviced separately from the subsea equipment to prevent unnecessary maintenance in the event of monitoring system failure.

SUMMARY

The present invention addresses these needs by providing systems and methods for monitoring subsea equipment using a plurality of sensors and a digital data processor to analyze data collected by the sensors. For example, a system can include a plurality of acoustic sensors and the signals detected by the sensors can be utilized to determine any of a variety of characteristics of the equipment (e.g., the rotation speed of a drill, the presence of internal or external leaks, the presence of worn seals or bearings, etc.). The systems described herein generally include a plurality of acoustic sensor arrays both mounted on and positioned remote from subsea equipment being monitored. The use of multiple arrays (each containing multiple acoustic sensors) positioned close to, and remote from, equipment being monitored can allow the digital data processor to isolate particular areas of the equipment being monitored, or to locate an origin of a detected acoustic signal. Furthermore, the acoustic monitoring systems described herein can identify particular acoustic signals associated with a physical event, e.g., the formation of a leak, etc., and track trends over time to identify operational abnormalities. Finally, the increased amount of acoustic data collected by the plurality of sensors provides a greater amount of detail than known monitoring instruments. This can allow, for example, monitoring of individual seals, bearings, or other components to determine when replacement is necessary prior to catastrophic component failure.

In one aspect, a system for monitoring subsea equipment includes a plurality of acoustic sensor arrays that each include at least two acoustic sensors, wherein at least a first acoustic sensor array is mounted on an outer surface of subsea equipment being monitored and at least a second acoustic sensor array is positioned remote from the subsea equipment. The system also includes a digital data processor in communication with the plurality of acoustic sensor arrays, and the digital data processor can be configured to process data from selected sensors of the plurality of acoustic sensor arrays to both selectively focus on a portion of the subsea equipment and to determine a point of origin of an acoustic signal. These abilities can allow a subsea equipment monitoring system to, for example, detect an irregular sound, locate the origin of the sound in or on the equipment being monitored, and selectively listen to that portion of the equipment. All of this is possible even though the system might not include an acoustic sensor in the immediate area of the portion being examined.

The enhanced monitoring capabilities of the systems described herein can be combined with traditional equipment monitoring systems to confirm expected operation of subsea equipment. For example, in one aspect, a method for monitoring subsea drilling includes detecting acoustic signals generated by a drill using a plurality of acoustic sensor arrays that each include at least two acoustic sensors, wherein at least a first acoustic sensor array is mounted on an outer surface of a subsea blowout preventer (BOP) surrounding the drill and at least a second acoustic sensor array is positioned remote from the BOP. The method also includes determining an operating characteristic of the drill within the BOP based on the detected acoustic signals using a digital data processor that communicates with the plurality of acoustic sensor arrays. Further, the method includes detecting the operating characteristic of the drill at a location above a surface of the sea, as well as alerting a user via a user interface coupled to the digital data processor if a difference between the characteristic value of the drill within the BOP and the characteristic value of the drill above the surface of the sea is greater than a predetermined amount. For example, if the operating characteristic being measured is the rotation speed of a drill, a difference between speeds measured at the surface and seafloor can indicate tension build-up (wind-up) in the drill.

The systems described herein can uniquely identify acoustic signals associated with physical events and conclude that a particular event has occurred based on the detection of a unique signal. In one aspect, for example, a method for detecting leaks in subsea equipment can include detecting acoustic signals generated by subsea equipment using a plurality of acoustic sensor arrays that each include at least two acoustic sensors, wherein at least a first acoustic sensor array is mounted on an outer surface of the subsea equipment and at least a second acoustic sensor array is positioned remote from the subsea equipment. The method can further include developing a baseline of acoustic signals produced during normal operation of the subsea equipment using a digital data processor coupled to the plurality of acoustic sensor arrays, as well as alerting a user via a user interface coupled to the digital data processor if a detected acoustic signal differs from the baseline by at least a predetermined amount.

One of skill in the art will appreciate further variations and advantages of the systems described herein relative to the prior art. Such variations are considered within the scope of the invention.

BRIEF DESCRIPTION OF THE DRAWINGS

The aspects and embodiments of the invention described above will be more fully understood from the following detailed description taken in conjunction with the accompanying drawings, in which.

DETAILED DESCRIPTION

Certain exemplary embodiments will now be described to provide an overall understanding of the principles of the systems and methods disclosed herein. One or more examples of these embodiments are illustrated in the accompanying drawings. Those skilled in the art will understand that the systems and methods specifically described herein and illustrated in the accompanying drawings are non-limiting exemplary embodiments and that the scope of the present invention is defined solely by the claims. The features illustrated or described in connection with one exemplary embodiment may be combined with the features of other embodiments. Such modifications and variations are intended to be included within the scope of the present invention.

The present invention is generally directed to systems and methods for monitoring subsea equipment that employ a plurality of non-intrusive sensors to provide a detailed view of the equipment during operation. The systems and methods described herein can be utilized to determine a variety of characteristics of the equipment being monitored, including operating characteristics (e.g., the speed of rotating machinery, etc.), equipment failures (e.g., internal and external leaks, cracks, etc.), and operational abnormalities (e.g., vibrations, erratic flow, pressure transients, gas kicks, etc.).

The systems and methods described herein can also be used to identify acoustic or vibrational changes associated with normal wear such that preventative maintenance can be performed when truly necessary and before catastrophic failure of any component.

The systems and methods disclosed herein can be applied broadly to any subsea machinery or equipment, but are described herein in connection with use on an oil well blowout preventer (BOP). A BOP is a piece of safety equipment used in subsea oil and/or gas drilling to prevent uncontrolled flow from a well (i.e., a blowout). The BOP includes a vertical "stack" that sits atop a wellhead on the seafloor. The stack includes a series of hydraulically actuated shears that are meant to seal off a wellhead by force in the event of a blowout. The systems described herein can be utilized to monitor any of a number of different specific BOP configurations and/or architectures known in the art.

Figure 1:
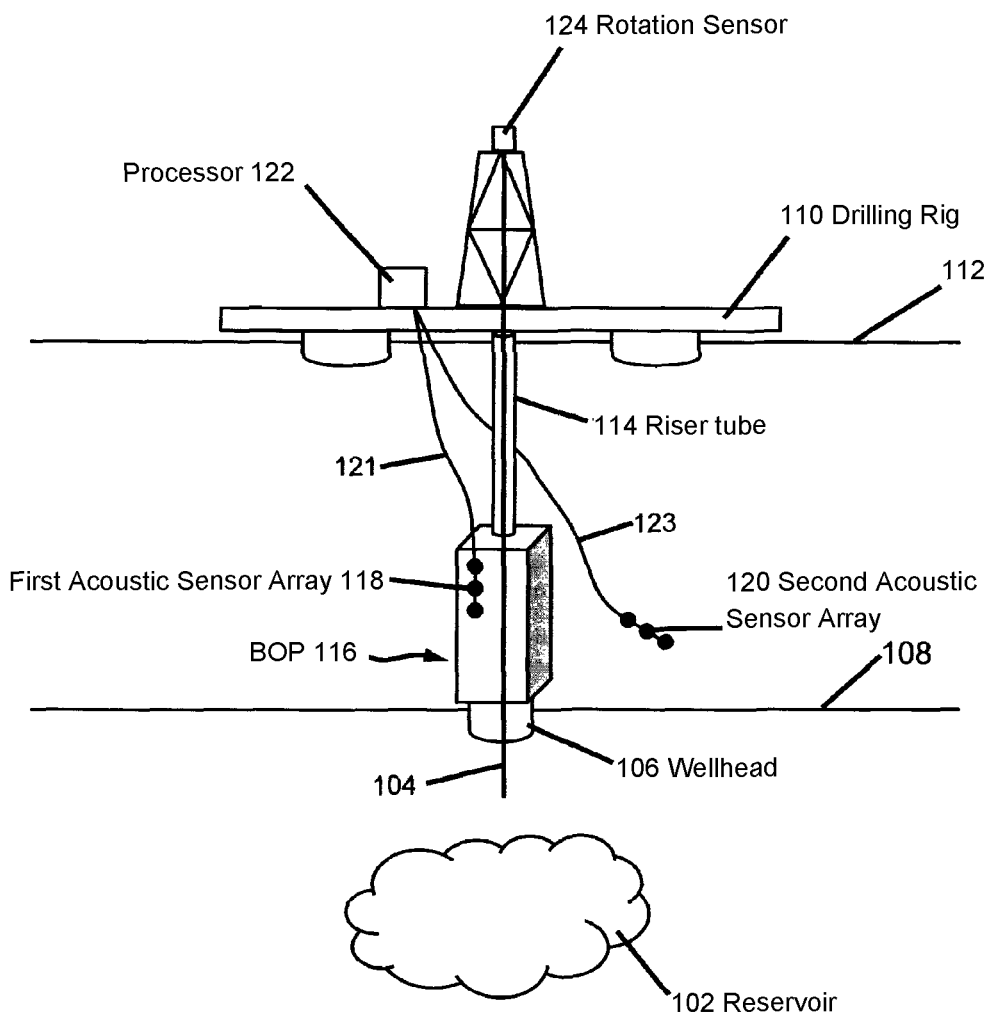
FIG. 1 is an illustration of one embodiment of a subsea equipment monitoring system.

FIG. 1 illustrates a typical subsea drilling operation to extract natural gas and/or oil from an underground reservoir 102. In particular, a drill 104 is driven through a wellhead 106 on the seafloor 108 from a rig 110 floating at the sea surface 112. The drill 104 extends from the rig to the wellhead 106 through a riser tube 114 that can be used to capture the underground oil and/or gas (note that FIG. 1 is not shown to scale, as the drill 104 and riser tube 114 can extend for thousands of feet to span the depth of the ocean at the site of the well). Finally, a BOP 116 is shown in its typical location on top of the wellhead 106.

Also shown in FIG. 1 is one embodiment of a subsea equipment monitoring system used to monitor the BOP 116. As shown in the figure, the system includes a first acoustic sensor array 118 mounted on an outer surface of the BOP 116, a second acoustic sensor array 120 positioned remote from the BOP 116, and a digital data processor 122 in communication with the plurality of acoustic sensor arrays 118, 120. Each acoustic sensor array includes a plurality of individual acoustic sensors clustered together, e.g., the arrays 118, 120 in FIG. 1 each include three individual acoustic sensors.

The data collected by the arrays 118, 120 can be communicated through tethers 121, 123 to the digital data processor 122 for subsequent signal processing and analysis. The digital data processor 122 can provide operators with several important monitoring capabilities, including (1) beam-forming, i.e., selective focusing on a desired portion of the BOP 116 (even if no individual sensor is located at the desired portion), (2) source localization, i.e., the identification of an origin point of a detected sound, (3) event identification, i.e., the association of a particular acoustic signal with a physical event, and (4) trend identification, i.e., the identification of acoustic signal changes over time.

The ability to provide robust monitoring through signal processing and analysis is made possible by the architecture of the acoustic sensor arrays relative to the equipment being monitored (e.g., the BOP 116). In particular, the system includes at least one acoustic sensor array (itself having at least two individual acoustic sensors) mounted on the equipment (either in direct contact with the equipment or immediately adjacent thereto) and at least one acoustic sensor array positioned remote from the equipment. This clustering of a plurality of acoustic sensors both near to, and remote from, the equipment allows acoustic signals to be detected at a variety of positions and distances relative to the equipment being monitored. In addition, the clustering and positioning of sensors relative to the equipment being monitored can provide better detection of certain frequencies that may not otherwise be detected. All of the collected data can be processed in parallel by the digital data processor 122 to, e.g., triangulate the origin of a detected sound, isolate only those sounds originating from a particular location, etc.

Figure 2:
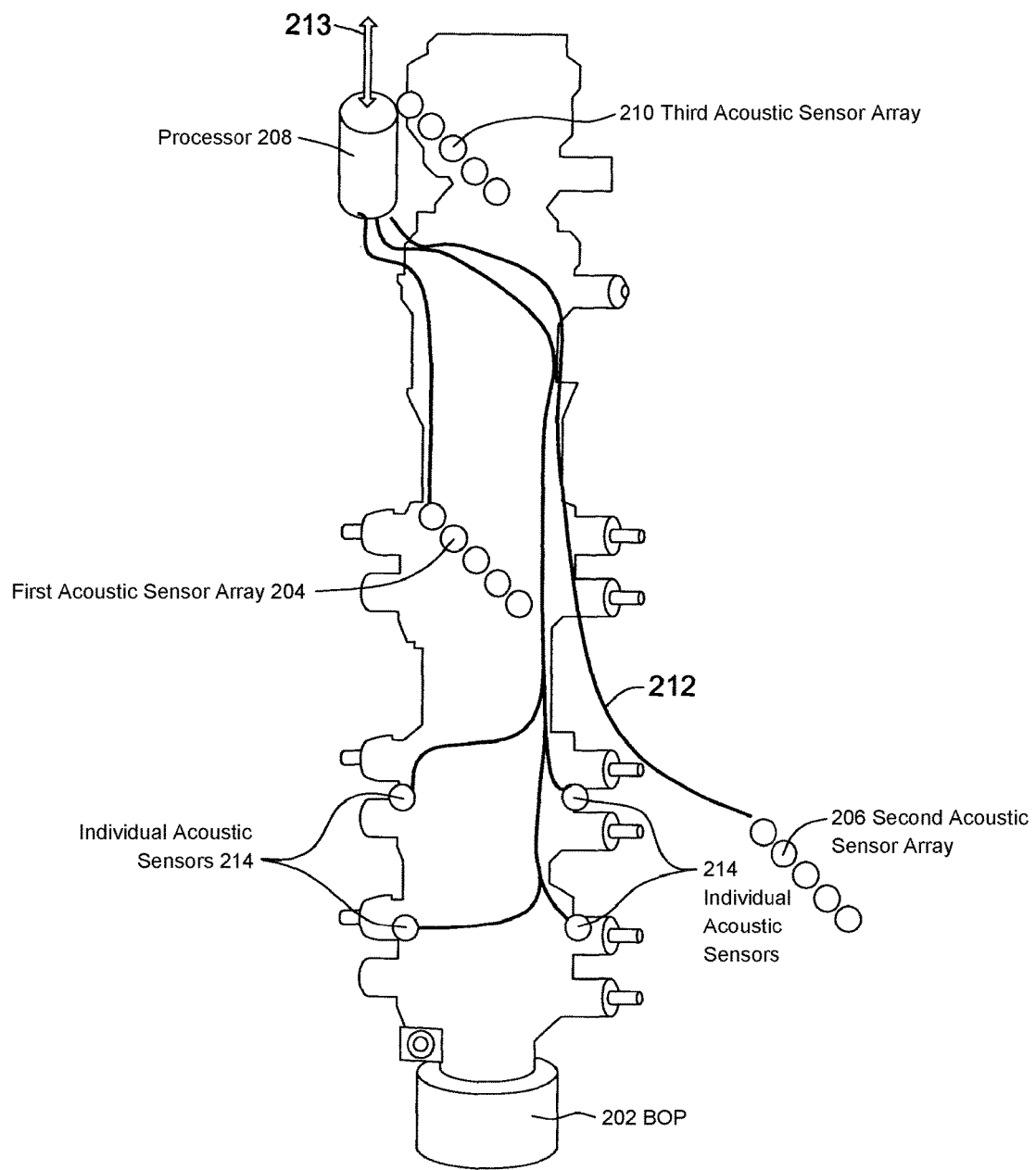
FIG. 2 is an illustration of an alternative embodiment of a subsea equipment monitoring system.

FIG. 2 illustrates an alternative embodiment of a subsea equipment monitoring system deployed on a BOP 202. The system includes a first acoustic sensor array 204 mounted on an external surface of the BOP 202, as well as a second acoustic sensor array 206 positioned remote from the BOP. In this embodiment, a digital data processor 208 is positioned at the site of the equipment being monitored, rather than on a surface drilling rig, as shown in FIG. 1. The digital data processor 208 can be mounted on an external surface of the BOP 202 as shown, or can be mounted to the seafloor or another piece of equipment at a location nearby the BOP. In addition, a third acoustic sensor array 210 is shown coupled to the digital data processor 208. The third acoustic sensor array 210, as well as any other acoustic sensor arrays that may be included, can add to the data collected by the first and second acoustic sensor arrays 204, 206.

Each of the sensor arrays 204, 206, 210, can include at least two individual acoustic sensors. For example, in the embodiment shown in FIG. 1, the acoustic sensor arrays 118, 120 each include three individual acoustic sensors, while the arrays 204, 206, 210 each include five individual sensors. The particular number of sensors used in an array can be determined based on available space, as well as requirements for power, communication bandwidth, etc. Further, any of a variety of known acoustic sensors (e.g., hydrophones, etc.) can be utilized in the arrays 204, 206, 210. For example, in some embodiments, piezoelectric ultrasonic acoustic sensors can be employed in the acoustic sensors arrays.

The individual sensors in an array can be arranged in a variety of configurations relative to one another. For example, the individual sensors in an array can be rigidly fixed to one another in a number of shapes (e.g., disposed in a straight line as shown in FIG. 2), or they can be coupled to one another in a manner that permits relative motion (e.g., by connecting them with a flexible wire or tether). In addition, a distance between the individual sensors in an array can be uniform or varied, and can vary among different arrays in certain embodiments.

Moreover, each of the individual sensors in an array can be housed together or individually. In some embodiments, housing sensors individually can provide an additional advantage in that water ingress into one housing will not cause a failure of all sensors in the array. Separate sensor housings can therefore provide redundancy for the array and can allow the monitoring system to continue operating even if several individual sensors fail over time.

Acoustic sensor arrays, such as the array 204, can be mounted on the BOP 202 in a variety of manners known in the art. For example, in some embodiments the array 204 can be mounted to the BOP 202 using bolts or magnets. In such an embodiment, the array 204 can act as a vibration sensor as well, given its rigid attachment to the BOP 202. In other embodiments, however, the array 204 can be mounted on the BOP 202 with a small amount of clearance between the individual sensors of the array and the BOP. Positioning the array 204 immediately adjacent to the BOP 202 in this manner will have little effect on its ability to detect sounds, given the transmission properties of water. Finally, in still other embodiments, a subset of the individual sensors of a sensor array can be rigidly mounted on the BOP, and a subset of the individual sensors can be mounted on the BOP at a position immediately adjacent thereto. All of these configurations can be varied across a number of arrays (or individual sensors within an array) to provide enhanced acoustic detection capability.

Other acoustic sensor arrays, such as the array 206, can be positioned remote from the BOP 202. In the illustrated embodiment, the acoustic sensor array 206 is freely suspended a distance from the BOP 202, but is coupled to the digital data processor 208 by a tether 212. As noted above, the acoustic sensor array 206 can have a variety of configurations, including any number of individual acoustic sensors arranged in a variety of geometries (e.g., straight line, circle, sphere, etc.). In addition, the array 206 can be suspended in any desired orientation (e.g., vertical, horizontal, diagonal, etc.) relative to the BOP 202 of the seafloor. For example, in addition to the tether 212 that couples the array 206 to the digital data processor 208, additional ropes, cables, or other tethers can be used to anchor the array 206 to the seafloor, the BOP 202, or other equipment in a desired location and orientation.

Any acoustic sensor array deployed to monitor subsea equipment can be in communications coupling with the digital data processor performing signal processing and analysis. As noted above, the digital data processor (or processors) can be positioned on the seafloor near the equipment being monitored (e.g., as shown in FIG. 2), or at the surface on a drilling rig or other above-water machinery (e.g., as shown in FIG. 1). Coupling between the acoustic sensor arrays and the digital data processor can be accomplished in a variety of manners, including the use of cable tethers (e.g., tether 212) that house power delivery and communication wires. Exemplary wires can include traditional copper (or other conductive metal) wiring, or fiber-optic cabling. In some embodiments, an oil-filled tether hose can be used to provide a barrier against water intrusion and to equalize pressure on the wires, thereby preventing uneven compression of copper and/or fiber-optic wires within the tether.

In other embodiments, however, wireless communications can be utilized to reduce the number of wires extending around the BOP 202 or other equipment being monitored. Wireless communication methods suitable for use in a subsea environment can include acoustical or short-range radio communications. In embodiments where wireless communications are employed, each acoustic sensor array can also include a battery coupled thereto to provide power for the individual acoustic sensors and any required wireless transmitters.

In some embodiments, the particular form of communications coupling employed can influence the position of the digital data processor. For example, if copper wiring or short-range wireless communications are employed, bandwidth and/or transmission distance limitations can require the digital data processor to be located on the seafloor, as shown in FIG. 2. If fiber-optic cabling is employed, however, large amounts of raw data can be transmitted rapidly to a digital data processor positioned at the ocean's surface, as shown in FIG. 1. In still other embodiments, a repeater positioned on the seafloor can be utilized, e.g., to collect short-range wireless signals and communicate data to the surface via a single fiber-optic connection (similar to the single connection 213 that couples the digital data processor 208 to a surface drilling rig).

In certain embodiments, a subsea equipment monitoring system can also include one or more individual acoustic sensors mounted on the equipment being monitored. For example, FIG. 2 shows several individual acoustic sensors 214 mounted on the BOP 202 at various locations. These individual acoustic sensors can be identical to the individual acoustic sensors used in each of the acoustic sensor arrays 204, 206, 210, and can be mounted on the BOP 202 in the same manner as the first acoustic sensor array 204. The individual sensors 214 can be positioned near individual components of the BOP 202, such as a valve, bearing, seal, etc., and can provide localized detection of sound and/or vibration originating from the component. This data can be combined with data captured from the acoustic sensor arrays to provide better localization of sound origination (e.g., by allowing for discrimination between two seals located close to one another, etc.). Moreover, it is also possible that one or more individual acoustic sensors can be positioned remote from the equipment being monitored to provide additional input to the digital data processor.

Figure 3:
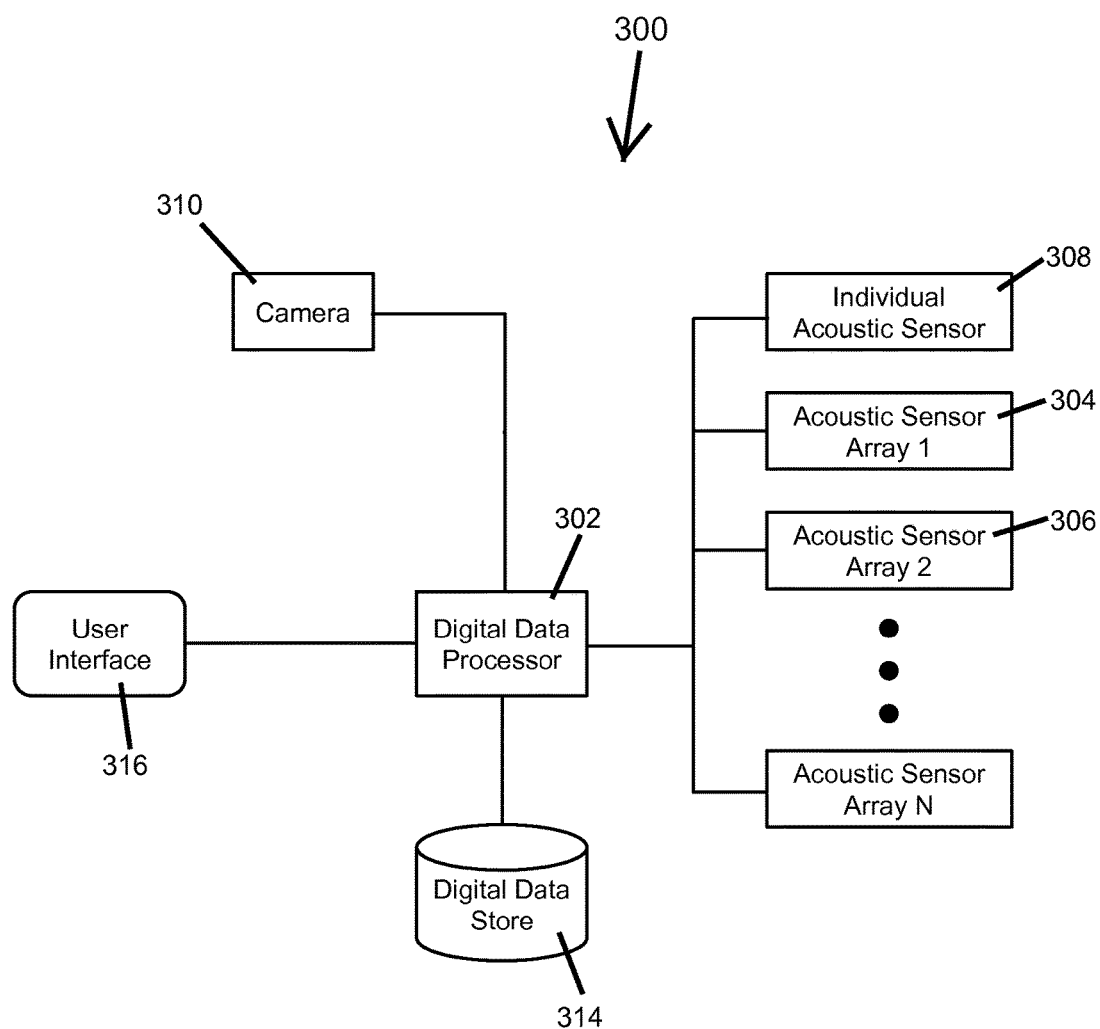
FIG. 3 is a schematic diagram of still another embodiment of a subsea equipment monitoring system.

In still other embodiments, other types of sensors can be integrated into a subsea equipment monitoring system along with the plurality of acoustic sensor arrays and any additional individual acoustic sensors. FIG. 3 illustrates one embodiment of a subsea equipment monitoring system 300 that includes a digital data processor 302 as well as a first acoustic sensor array 304, a second acoustic sensor array 306, and an individual acoustic sensor 308. The system further includes a camera 310. The camera 310 can be mounted on the seafloor near the BOP 202, for example, or can be disposed on a remotely operated vehicle (ROV) positioned near the BOP 202. In addition, any other type of sensor can be used in combination with the system 300, e.g., pressure and temperature sensors, sensors positioned on a surface drilling rig, etc.

Regardless of their particular type or position, data captured by additional sensors can be incorporated into the signal processing and analysis conducted by the digital data processor 302. For example, in one embodiment data gathered by the acoustic sensors of the subsea equipment monitoring system can be used to confirm or quality-check data gathered by an additional sensor, such as the camera 310. The camera 310 may indicate, for example, that the BOP 202 or other equipment is vibrating, when in fact it may be a faulty camera mount that is creating vibration. Data gathered from the acoustic sensor arrays mounted on, and positioned remote from, the BOP can be utilized to confirm or refute the camera's indication of vibration at the equipment.

The digital data processor 302 can have a number of different configurations. For example, the digital data processor 302 can be a hardened computing device configured for placement on the seafloor near (or on) the BOP, or it can be a more traditional computing device disposed on a surface drilling rig or a ship. The digital data processor 302 can be a single computing device, or it can include a number of different digital data processors networked together. Furthermore, the digital data processor 302 can be coupled to a digital data store 314 so that analysis, historical trends, and other data can be accessed and updated as necessary. Exemplary digital data stores include individual solid state or other types of digital storage media, networked digital storage repositories, etc. The digital data processor 302 can also be coupled to a user interface device 316 to allow interaction with one or more operators. For example, in some embodiments a digital data processor 302 can be coupled to a display screen, status board, keyboard, mouse, etc. to allow user interaction with the digital data processor 302. Other exemplary user interface devices can include warning lights, audio speakers, etc.

The digital data processor 302 utilizes multivariate signal processing to analyze data collected by all the acoustic sensor arrays, individual acoustic sensors, and other sensor types to isolate signals of interest. With respect to the acoustic sensor data, the digital data processor 302 can create multi-resolutional sensor clusters by combining acoustic data from subsets of the plurality of sensors in various ways. For example, in one embodiment a generic set of N acoustic sensors spread across a plurality of acoustic sensor arrays and distributed in three-dimensional space, the set can be divided into K subsets of minimum four sensors, where K is defined by the binomial coefficient (N, 4). Furthermore, each subset can be selected such that it spans three-dimensional space, and all sensors can be time-synchronized.

The resulting subsets can be processed in parallel to achieve a system with multi-resolutional properties. That is, a small sensor array (i.e., a short distance between individual sensors) can suffer from poor resolution on low frequencies and instability in distance estimation. Conversely, small sensor arrays can be better suited for high frequency detection because of spatial aliasing. Large sensor arrays (i.e., a long distance between individual sensors) can behave in an inverse fashion, exhibiting enhanced spatial resolution on low frequencies and improved performance in distance estimation. Importantly, the overall performance of the system will overcome difficulties of individual sensor arrays by combining them in various fashions, resulting in a multi-resolutional system.

As mentioned above, two primary capabilities provided by the signal processing of the digital data processor 302 are beam-forming and source-localization. In beam-forming, the system selectively focuses on a portion of the equipment being monitored to isolate sounds originating from that portion. This is accomplished in the digital data processor 302 by introducing appropriate phase delays to digitized raw sensor signals before summation in order to focus on a point in three-dimensional space, while at the same time ignoring contributions from other interfering sources at other locations in three-dimensional space. However, beam-forming theory in general reaches far beyond this basic concept and more optimum methods such as adaptive beam-forming can also be introduced. An adaptive beam-former is a dynamic system that automatically adapts to the incoming signals in order to maximize or minimize a desired parameter. Source-localization is essentially the inverse of beam-forming, wherein the origin point of a detected sound is determined. This is accomplished in the digital data processor 302 by estimating the phase delays of incoming acoustic sensor signals and mapping them onto geographical coordinates.

The digital data processor can also determine operating characteristics of the equipment being monitored, and compare those operating characteristics with one or more operating characteristics measured at a different location, e.g., above the surface of the water. Referring to FIG. 1, for example, the digital data processor 122 can be configured to determine the rotating speed of the drill 104 disposed within the BOP 116 using detected acoustic signals from the plurality of acoustic sensor arrays 118, 120. The digital data processor 122 can also be configured to determine the rotating speed of the drill 104 at a location above a surface of the sea, e.g., using rotation sensor 124 mounted on the drilling rig 110. The rotating speed above the surface of the water can then be compared to the rotating speed at the BOP. A significant difference in these values can indicate that tension is building in the drill shaft. If the difference between the sub-surface and top-side measurements is significantly large (e.g., exceeds a predetermined value), an operator can be alerted or other action can be taken (e.g., drill shut down, throttle adjustment, etc.). Of course, rotating speed of a drill passing through a BOP is just one example of an operating characteristic that can be determined by the subsea equipment monitoring system, and any of a variety of other characteristics can also be determined and compared to measurements taken at different locations in the drilling operation.

Figure 4:
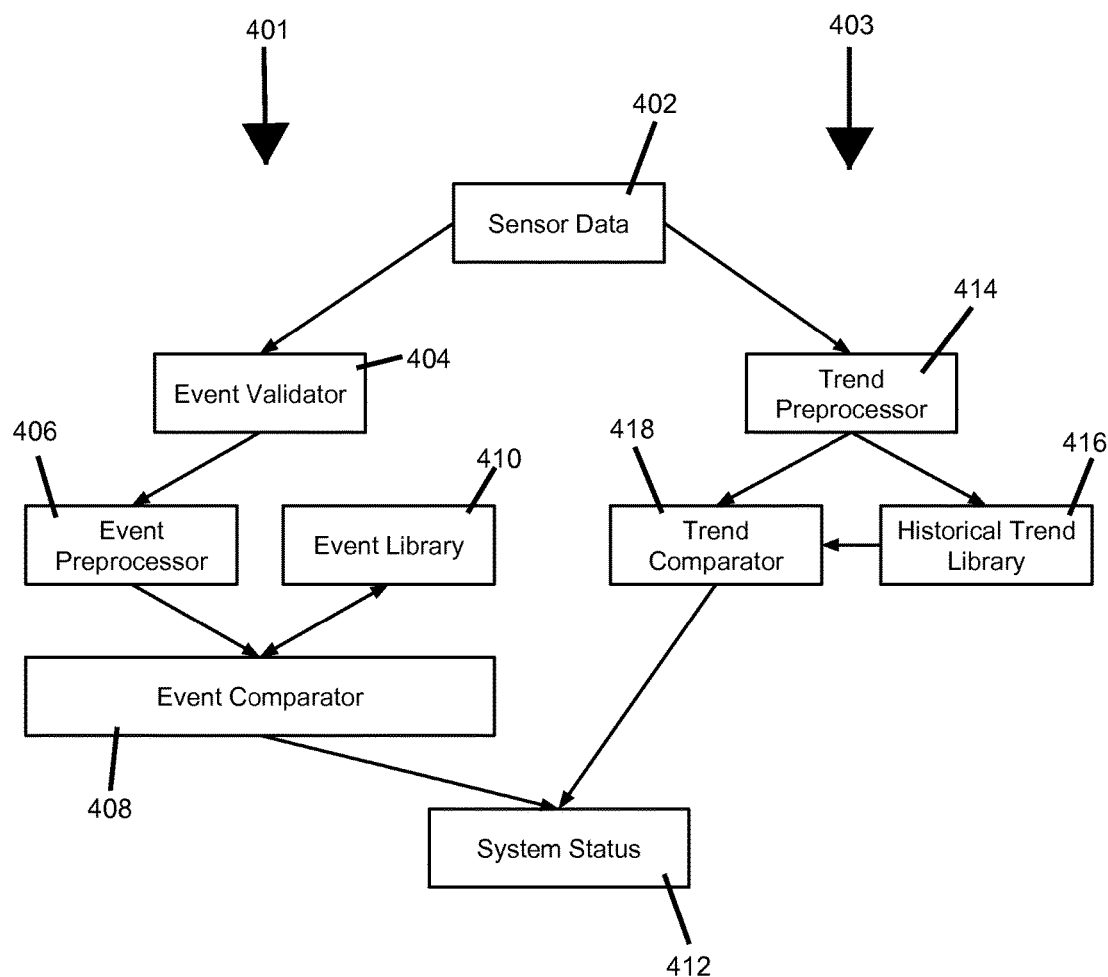
FIG. 4 is a flowchart illustrating one embodiment of sensor data flow through a digital data processor.

As noted above, in addition to selectively focusing on portions of equipment being monitored or determining operating characteristics of subsea equipment, the digital data processor can also identify physical events based on their unique acoustic signals and track acoustic trends over time to note departures from a baseline profile. For example, and as shown in FIG. 4, data 402 from all of the acoustic sensors of the plurality of sensor arrays, individual sensors, and any other sensors coupled to the system, can be routed in parallel to an event processing system 401 and a trend processing system 403.

The event system 401 can be configured to analyze sudden events of limited duration, e.g., closing and opening of BOP shear rams. An event validator 404 can process the data to rule out or confirm the presence of an event based on a predetermined set of rules. For example, a typical rule might require spatial stationarity, i.e., that origination sounds come from a stationary location, in order to qualify as an event (e.g., if acoustic signals are indicating that a particular seal has failed, the signals should continue to originate from the location of the failed seal). To determine spatial stationarity, the digital data processor can utilize its selective focusing and source-origination capabilities. For example, spatial stationarity can be measured by calculating the source of the event multiple times over a period of time. The standard deviation of these measurements can indicate if the source of the event is moving or not.

After determining that an event has occurred (or is occurring), an event preprocessor 406 can process and format the acoustic signals of the event. In some embodiments, the acoustic signals of the event can be processed into a signature of the event that includes a temporal distribution and a spatial distribution of the acoustic signals of the event. The temporal distribution can be, for example, a sparse representation such as a time-scale/time-frequency/time-Mel representation (e.g., using the Wavelet and/or Short-Time Fourier Transform) that describes the features of the event in an acoustical sense. The spatial distribution can be, for example, estimated using array processing including the cross-spectral matrix, complex analytic cross-correlations, phase transform, and a lag-to-angle and lag-to-distance mapping. In some embodiments, the Karhunen-Loève Transform can be applied to both distributions to reduce dimensionality and provide for easier classification and/or clustering of similar events.

An event comparator 408 can identify or classify the acoustic signals detected, or their computed signatures, using an event library 410 that includes a listing of physical events and their known associated acoustic signals or signatures. If the detected event matches one of those already stored in the event library 410, the event comparator 408 can update the system status 412 by reporting the occurrence of the event and recommending or initiating a response action. This can be done, for example, using the user interface device 316 shown in FIG. 3. If, on the other hand, the detected acoustic signals or computed signature do not match any of the events stored in the event library 410, the detected acoustic signals and/or their computed signature can be stored in the event library 410 for later classification and association with a physical event. The event comparator 408 can be implemented using classification and machine learning theory, including discriminant analysis (DA) techniques or pattern matching algorithms, such as the dynamic programming (DP) algorithm, or, e.g., using a K-nearest-neighbors approach.

In parallel with the event detection and classification system 401, the digital data processor can also execute a trend system 403 based on the data collected by the acoustic sensor arrays. The trend system 403 can execute continuously independent of any special events found in the collected data. The trend system can include a trend preprocessor 414 that forms a baseline of acoustic signals—or data calculated therefrom—produced during normal operation of the subsea equipment. The trend preprocessor can calculate a number of trends from the input data given a prescribed configuration. For example, computed trends can include complete frequency spectra, energy in certain frequency bands, positions of signal sources, level of spatial stationarity, etc. The baseline of acoustic signals, as well as any other computed data or trends, can be stored in a historical trend library 416. A trend comparator 418 can compare the detected acoustic signals (or trend data computed therefrom) to baseline acoustic signals (or trend data computed therefrom) to determine if the monitored equipment is operating in a normal state or not. If a difference between the detected values and the baseline values exceeds a predetermined amount, the system status 412 can be updated to alert an operator.

The combination of event detection and trend monitoring can allow the subsea equipment monitoring systems described herein to detect a number of operating abnormalities of subsea equipment. Examples include the detection of internal and external leaks, erratic flow, gas kicks (flow-induced vibrations from the annulus or drilling string), and erratic pressure transients, among others. Of particular note is that the systems described herein can detect the presence of worn seals or bearings prior to catastrophic failure of these components. That is, the acoustic signals emitted by a seal can change over time (e.g., deviate from a baseline acoustic signal) as the seal wears and the subsea equipment monitoring systems described herein can detect this change. Prior art acoustic monitoring systems are not able to provide the level of detail necessary to detect this change. The ability to detect individual seal wear can allow operators to plan preventative maintenance in a more intelligent manner based on actual wear and tear of the subsea equipment rather than a set maintenance schedule. Such a modification has the potential to increase both the safety and efficiency of subsea drilling operations or other activities.

The subsea equipment monitoring systems described herein also provide an ability to detect cracks forming in the subsea equipment at a very early stage. In particular, developing cracks, e.g., in the housing of a piece of equipment, can create sudden transient acoustic signals. Prior art acoustic monitoring systems are not able to detect these transient signals that indicate the early stages of crack formation. Note that the inability of prior art systems to detect these transient signals can stem from either an inability to detect the signal at all (i.e., imprecise acoustic detection), or an inability to determine that the transient represents a departure from the normal operation of the equipment (i.e., no trend monitoring).

Seal wear and crack formation detection are just two examples of improvements over prior art subsea monitoring systems. Other advantages of the systems and methods described herein include the use of externally-mounted, non-intrusive arrays of acoustic sensors. Using non-intrusive arrays allows the monitoring system to be serviced separately from the subsea equipment, which avoids the need to shut down a drilling operation or raise the subsea equipment to repair the monitoring system. In addition, the use of arrays having two or more individual acoustic sensors can provide redundancy to the system in the event that one or more sensors fails, again allowing service of a monitoring system to be performed at the most convenient and efficient time for the operator. Still further, the use of non-intrusive acoustic sensor arrays allows for easy retro-fitting of subsea equipment such that the monitoring system does not require the purchase and installation of new subsea equipment.

The increased visibility of the subsea equipment during operation allows operators to increase the safety, better address failures, and increase efficiency by optimizing equipment down-time for preventative maintenance. As noted above, the embodiments disclosed herein have focused on monitoring of a BOP, but the subsea equipment monitoring systems described herein can be used with almost any subsea operation that produces unique acoustic signals. BOP-specific examples include monitoring the landing of a BOP on a wellhead during initial construction of the well, operation of shearing rams to seal the well, confirmation that well flow has been stopped after activation of shearing rams, characterization of flow within the BOP, etc. In addition, the systems described herein can be employed on any of a variety of other subsea equipment, including solenoid valves, pumps, compressors, etc.

The advantages of the systems described herein derive from the use of a plurality of acoustic sensor arrays, where at least a first array is mounted on equipment being monitored and at least a second array is positioned remote from the equipment being monitored. A digital data processor, when coupled with this arrangement of acoustic sensor arrays, can selectively analyze signals from the set of acoustic sensor arrays to provide the powerful monitoring capabilities described above.

All papers and publications cited herein are hereby incorporated by reference in their entirety. One skilled in the art will appreciate further features and advantages of the invention based on the above-described embodiments. Accordingly, the invention is not to be limited by what has been particularly shown and described, except as indicated by the appended claims.

What is claimed is:

1. A system for monitoring subsea equipment, comprising:
   a plurality of acoustic sensor arrays that each include at least two individually housed acoustic sensors configured to receive an acoustic signal generated by subsea equipment being monitored, wherein at least a first acoustic sensor array is mounted on an outer surface of the subsea equipment and at least a second acoustic sensor array is positioned remote from the subsea equipment;
   a digital data processor in communication with the plurality of acoustic sensor arrays, the digital data processor being configured to process data from selected sensors of the plurality of acoustic sensor arrays, the data representing the acoustic signal, the digital data processor further configured to:
      monitor, using beam forming, a portion of the subsea equipment from which the acoustic signal originates and ignore interfering acoustic signals originating from other portions of the subsea equipment, and
      determine, based on the acoustic signal, a point of origin of the acoustic signal within the portion of the subsea equipment,
      wherein the digital data processor is coupled to the first acoustic sensor array by a first tether, wherein the digital data processor is coupled to the second acoustic sensor array by a second tether, wherein the first acoustic sensor array is coupled to a free end of the first tether and is in direct contact with the subsea equipment being monitored, and wherein the second acoustic sensor array is coupled to a free end of the second tether and freely suspended from the second tether; and
   a user interface coupled to the digital data processor, the user interface configured to alert a user to the acoustic signal received by the acoustic sensor arrays and to the point of origin within the portion of the subsea equipment.

2. The system of claim 1, wherein the digital data processor is located below a surface of the sea, and the plurality of acoustic sensor arrays includes at least a third acoustic sensor array attached to the digital data processor.

3. The system of claim 1, further comprising at least one individual acoustic sensor mounted on the outer surface of the subsea equipment.

4. The system of claim 1, wherein the first acoustic sensor array mounted on the subsea equipment is any of bolted and magnetically coupled to the subsea equipment.

5. The system of claim 1, wherein the first acoustic sensor array is fixed relative to the subsea equipment, and wherein the second acoustic sensor array is moveable relative to the subsea equipment.

6. The system of claim 1, wherein the second tether provides power to the second acoustic sensor array and provides communication between the second acoustic sensor array and the digital data processor.

7. The system of claim 1, further comprising an image capture device.

8. The system of claim 1, wherein the subsea equipment is an oil well blow out preventer.

9. The system of claim 1, wherein each of the plurality of acoustic sensor arrays are configured to communicate with the digital data processor wirelessly.

10. The system of claim 1, wherein the digital data processor is further configured to identify an event based on a comparison of a detected acoustic signal to a library of acoustic signals associated with one or more known events.

11. A method for detecting leaks in subsea equipment, comprising:
   monitoring, using beam forming, a portion of the subsea equipment to isolate acoustic signals originating from the portion of the subsea equipment from interfering acoustic signals from other portions of the subsea equipment;
   detecting acoustic signals generated by subsea equipment and originating from the portion of the subsea equipment using a plurality of acoustic sensor arrays that each include at least two individually housed acoustic sensors configured to receive the acoustic signals, wherein at least a first acoustic sensor array is mounted on an outer surface of the subsea equipment and at least a second acoustic sensor array is positioned remote from the subsea equipment;
   developing a baseline of acoustic signals produced during normal operation of the subsea equipment using a digital data processor coupled to the plurality of acoustic sensor arrays, the digital data processor coupled to the first acoustic sensor array using a first tether and coupled to the second acoustic sensor array using a second tether, the first acoustic sensor array coupled to a free end of the first tether and in direct contact with the subsea equipment, and the second acoustic sensor array coupled to a free end of the second tether and freely suspended from the second tether; and alerting a user via a user interface coupled to the digital data processor if a detected acoustic signal originating from the portion of the subsea equipment differs from the baseline by at least a predetermined amount.

12. The method of claim 11, further comprising determining a point of origin of the detected acoustic signal that differs from the baseline signature by at least the predetermined amount.

13. The method of claim 11, wherein the subsea equipment is an oil well blow out preventer.

14. The method of claim 11, further comprising: searching a digital data store containing a library of events and associated acoustic signals for an acoustic signal that matches the detected acoustic signal;

if a match is found, alerting a user of the event associated with the detected acoustic signal; and if a match is not found, storing the detected acoustic signal in the digital data store for future association with an event.

* * * * *